United States Patent [19]
Conners et al.

[11] Patent Number: 6,062,146
[45] Date of Patent: May 16, 2000

[54] STORAGE SUPPORT ASSEMBLY FOR LUGGAGE IN A VEHICLE

[76] Inventors: Jerry P. Conners; Virginia S. Conners, both of 130 W. Lake St., Barrington, Ill. 60010

[21] Appl. No.: 08/971,226

[22] Filed: Nov. 15, 1997

[51] Int. Cl.⁷ .................................................... A47R 37/00
[52] U.S. Cl. .......................... 108/44; 224/564; 296/37.16
[58] Field of Search ............................... 108/44; 248/149, 248/172, 173; 211/187; 224/539, 540, 542, 549, 550, 925, 311, 555, 564, 551, 8, 42.34; 296/37.1, 37.16, 37.6

[56] References Cited

U.S. PATENT DOCUMENTS

| | | | |
|---|---|---|---|
| 1,300,533 | 4/1919 | Wessinger | 248/149 |
| 2,767,896 | 10/1956 | Beck | 296/37.16 |
| 2,889,097 | 6/1959 | Broehl | 296/37.16 |
| 3,291,520 | 12/1966 | Smith | 296/37.16 |
| 3,623,765 | 11/1971 | Bowen . | |
| 3,829,773 | 8/1974 | Nigg . | |
| 3,880,091 | 4/1975 | Heinonen . | |
| 3,931,751 | 1/1976 | Simonson . | |
| 4,171,078 | 10/1979 | Morgan | 224/42.46 |
| 4,494,465 | 1/1985 | Fick, Jr. . | |
| 4,824,163 | 4/1989 | Hendrych . | |
| 4,864,939 | 9/1989 | Bailey et al. . | |
| 5,442,984 | 8/1995 | Tate . | |
| 5,469,999 | 11/1995 | Phirippidis | 248/129 |
| 5,921,614 | 7/1999 | Beidermann et al. | 296/165 |

*Primary Examiner*—Peter M. Cuomo
*Assistant Examiner*—Gerald A. Anderson
*Attorney, Agent, or Firm*—Mathew R. P. Perrone, Jr.

[57] ABSTRACT

A storage support assembly, which provides a luggage rack for a rear portion of a vehicle, has an adjustable frame support capable of receiving a panel on a top portion thereof in order to provide accessibility and compartments for storage of luggage.

8 Claims, 2 Drawing Sheets

STORAGE SUPPORT ASSEMBLY FOR LUGGAGE IN A VEHICLE

This invention relates to a storage support and more particularly to a storage support assembly for luggage in a vehicle adapted for use in a hatchback type vehicle.

BACKGROUND OF THE INVENTION

There are a number different types of hatchback type vehicles. These vehicles range from mini-vans to truck chassis based vehicles having a vehicle body adapted for use basically for family purposes. These vehicles can be two wheel, four wheel or all wheel drive. The two wheel drive vehicles are driven by the rear wheels or the front wheels. The rear portion of these vans and other vehicles is open and does not include a trunk like space, as in a sedan. This openness greatly increases the space inside the vehicle.

However, once equipment is stacked inside the vehicle it is sometimes difficult to retrieve the luggage or other material that is stacked therein. It is desired to effectively divide this vehicle and the storage components thereof into chambers. Specifically, no efficient means for dividing this chamber into an effective luggage carrier exists. The stacked luggage or other items may mean that the vehicle must be unloaded to remove a specific suitcase, food cooler or other item.

One limitation of any device for subdividing this open space is that it is restricted to a particular type of vehicle. No effective way exists for device to fit a wide number of vehicles. If a flexible, compact device suitable for use in a wide variety of vehicles permits the divided of the interior space of a hatchback vehicle, great advantages are obtained.

Also, the device for subdividing this open space must take up little space yet be effective and easily adjusted or removable. Such a luggage support achievement has yet to be accomplished for the desired purpose. If these factors can be maximized great advantages can be obtained.

SUMMARY OF THE INVENTION

Among the many objectives of this invention is to provide a storage support assembly to act as a device for subdividing the rear portion of a hatchback vehicle.

Another objective of this invention is to provide a storage support assembly for subdividing the rear portion of a hatchback vehicle, into levels.

Yet another objective of this invention is to provide a storage support assembly for subdividing the rear portion of a hatchback vehicle, which takes minimal space in the storage area of a vehicle.

Still another objective of this invention is to provide a storage support assembly for subdividing the rear portion of a hatchback vehicle, which provides access to items stored therein.

Additionally, an objective of this invention is to provide a storage support assembly for subdividing the rear portion of a hatchback vehicle, which is easily installed in a vehicle.

Also, an objective of this invention is to provide a storage support assembly for subdividing the rear portion of a hatchback vehicle, which is easily removed from a vehicle.

A further objective of this invention is to provide a storage support assembly for subdividing the rear portion of a hatchback vehicle, which provides access to lower luggage.

These and other objectives of the invention (which other objectives become clear by consideration of the specification, claims and drawings as a whole) are met by providing a storage support assembly luggage rack for the rear of a vehicle having an adjustable frame support, adapted to receive an adjustable panel.

BRIEF DESCRIPTION OF DRAWINGS

Throughout the figures of the drawings where the same part appears in more than one figure the same number is applied thereto.

DESCRIPTION OF THE PREFERRED EMBODIMENTS

The storage support assembly for luggage in a vehicle includes a storage compartment frame of as a basis for the storage support assembly. The storage support assembly includes a frame support having a first end support and a second end support. The first end support and the second end support fit into the rear of the vehicle on either side thereof and rise about half way up the rear portion of the vehicle. This structure is especially suitable for use in a hatchback vehicle.

A panel may then fit on the frame support, to provide two luggage levels in the vehicle. The panel extends from the first end support to the second end support. The panel thus cooperates with the frame support in order to form a lower storage space beneath the panel, and an upper storage space above the panel. This structure makes the open rear luggage compartment and especially the contents thereof more accessible.

The legs on the frame support of this storage support assembly are designed to cooperate with any wheel hump and be supported very strongly within the space. The legs may be adjustable in length to fit a desired vehicle. The legs support a top brace. The brace itself may have two piece adjustability. Thus storage support may fit a plurality of vehicles. The first end support and the second end support cooperate to form a frame.

A panel is placed on the frame to provide the two luggage levels in the hatchback vehicle. The panel may be one piece, or two or more pieces. The two or more pieces may be separate or foldably joined. Foldably joined is preferred, using a long 180 degree hinge to form the folding mechanism. The two (2) sectioned panel, joined by a long hinge is preferred.

A two (2) section panel can be placed on the frame so that two (2) levels may be achieved for storage of luggage or other material. In this fashion, it may be of the stacking of luggage or material can be achieved. The two (2) panels that fit on the frame permit adjusting of the storage support assembly. The panels can be stacked one above the other when both panels are not desired and the panels can be both used when both are desired.

In this fashion, the storage compartment is efficiently used. The panels are of sufficient length to reach each side of the frame and sufficient width to permit the panels jointly to form an entire level of the rear portion. With this desired results, the storage of the luggage and other equipment desired to be carried may be achieved.

Adjustability may be achieved in any suitable fashion. This manner of making the storage support assembly adaptable to a variety of vehicles is preferably achieved by at least two telescoping members for the legs and top brace. They are positioned in any appropriate fashion, such clips, friction and the like. These telescoping members are preferably locked in place by nut and bolt assemblies.

Figure 1:
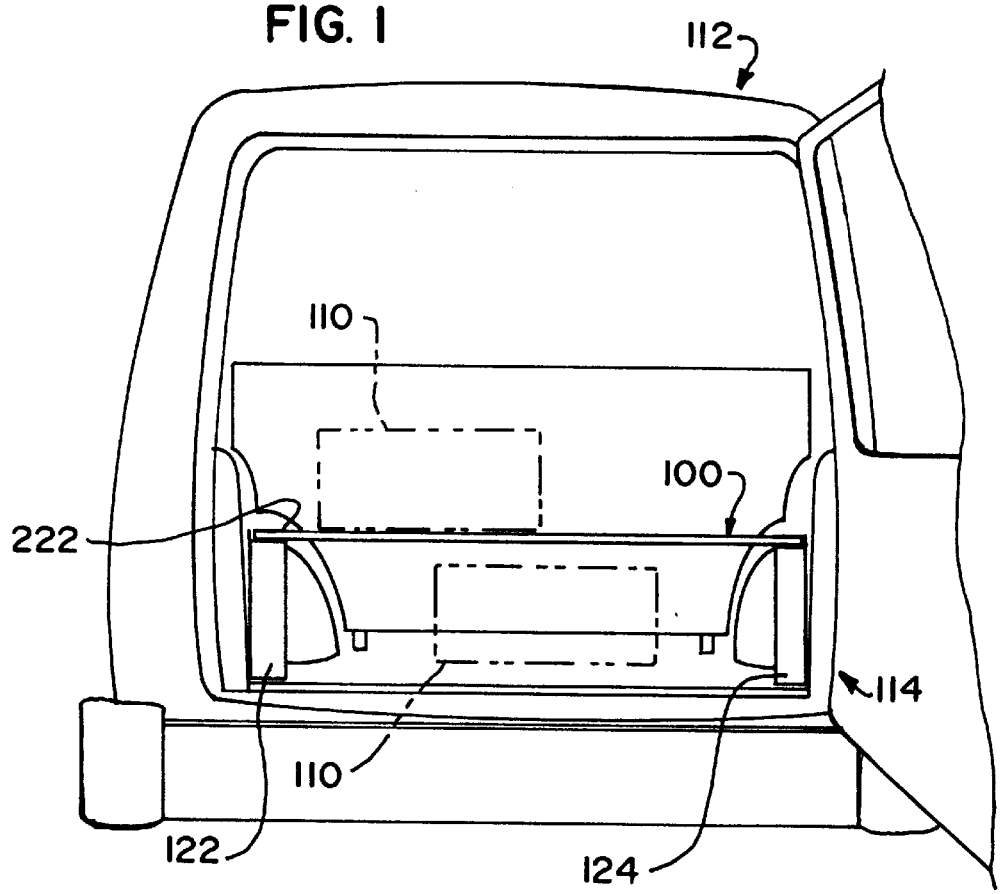
FIG. 1 depicts a perspective view of a storage support assembly 100 for luggage 110 in a vehicle 112.

Referring now to FIG. 1, the storage support assembly 100 for luggage 110 in a vehicle 112 includes a storage compartment frame 120 of as a basis for the storage support assembly 100.

Figure 2:
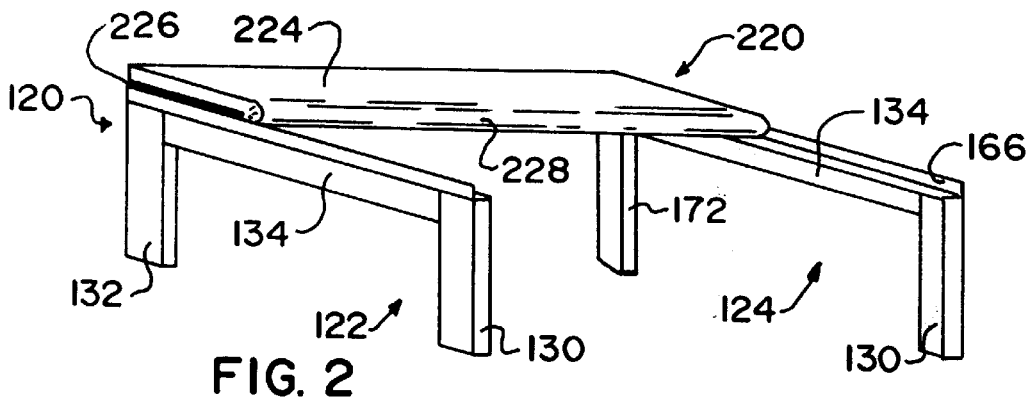
FIG. 2 depicts a front perspective view of the storage support assembly 100.

With FIG. 2, the storage support compartment frame 120 becomes more clear. As a fixed frame, storage support compartment frame 120 includes a first end support 122 and a second end support 124. The first end support 122 and the second end support 124 of the storage support assembly 100 fits into the rear portion 114 of the vehicle 112 on oppositely disposed sides thereof. Preferably, the first end support 122 and the second end support 124 rise up about half way up the rear portion 114 of the vehicle 112, or are adjusted as desired.

First end support 122 and second end support 124 are similar in structure. First end support 122 includes a first front leg 130 and a first rear leg 132. A first top rail 134 connects first front leg 130 to a first rear leg 132, by welding, bolting, or other suitable fastening device.

Figure 4:
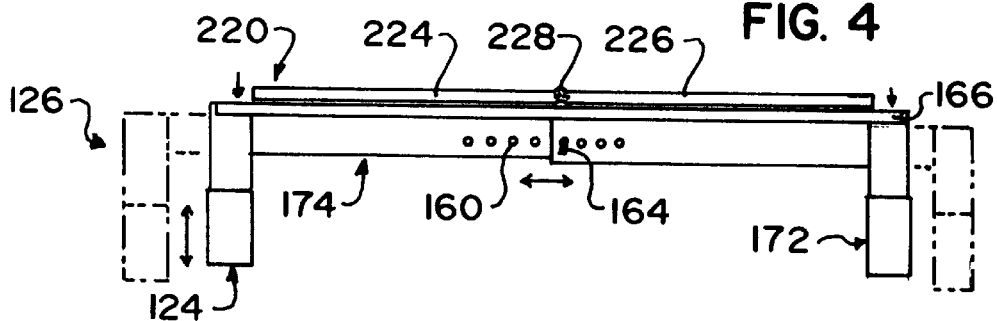
FIG. 4 depicts d rear, plan view of storage support assembly 100, with an adjustable frame 126.
Figure 5:
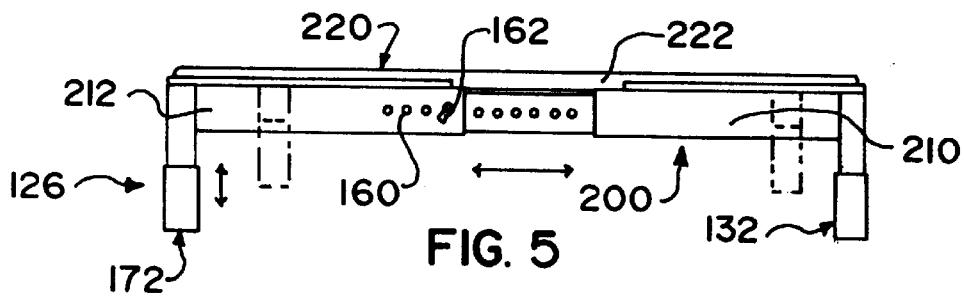
FIG. 5 depicts a rear plan view of storage support assembly 100, with an adjustable frame 126.
Figure 3:
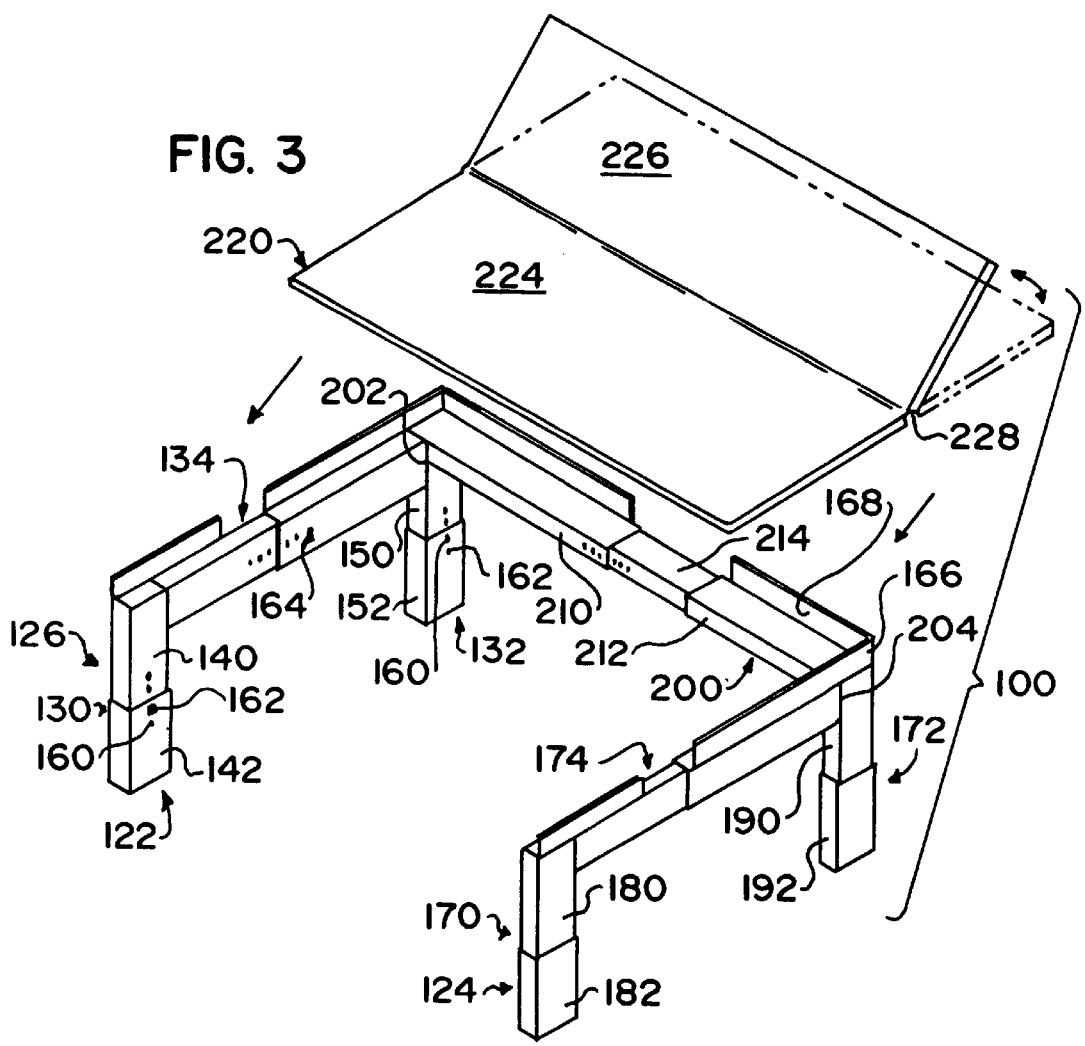
FIG. 3 depicts an exploded, front perspective of the storage support assembly 100, with an adjustable frame 126.

Adding FIG. 3, FIG. 4, and FIG. 5 to the consideration, adjustable frame 126 is depicted. In a preferred form, first front leg 130, first rear leg 132 and first top rail 134 have adjustable lengths. Such adjustability permits one version of the storage support assembly 100 to fit a wide variety of vehicles 112.

First front leg 130 has a first front upper member 140. First front upper member 140 joins first top rail 134 at respective ends thereof. In a preferred fashion first front upper member 140 receives first front lower member 142 in female to male relationship.

Likewise first rear leg 132 has a first rear upper member 150. First rear upper member 150 joins first top rail 134 at respective ends thereof. In a preferred fashion first rear upper member 150 receives first rear lower member 152 in female to male relationship.

Preferably, the first front upper member 140 is secured in relation to first front lower member 142 by a series of concentric apertures 160 in each member, which receive one or more of the desired nut and bolt assembly 162 or cotter pin assemblies 164, or equivalent fastening device. Likewise first rear upper member 150 is secured to first rear lower member 152 a series of concentric apertures 160 in each member member which receive the desired nut and bolt assembly 162, or the like. including FIG. 3, FIG. 4, and FIG. 5; second end support 124 includes a second front leg 170 and a second rear leg 172. A second top rail 174 connects second front leg 170 to a first rear leg 172, by welding, bolting, or other suitable fastening device.

In a preferred form, second front leg 170, second rear leg 172 and second top rail 174 have adjustable lengths. Such adjustability cooperates with first end support 122 in order to permit one version of the storage support assembly 100 to fit a wide variety of vehicles 112. Adjustability is preferably achieved by at least two telescoping members.

First top rail 134 and second top rail 174 each include, in a preferable form, a mounting ridge 166. Each mounting ridge 166 creates an L-shaped platform 168 on both first top rail 134 and second top rail 174. The L-shaped platforms 168 combine to provide positive positioning for support panel 220.

Second front leg 130 has a second front upper member 180. Second front upper member 180 joins second top rail 174 at respective ends thereof. In a preferred fashion second front upper member 180 receives second front lower member 182 in female to male relationship.

Likewise second rear leg 172 has a second rear upper member 190. Second rear upper member 190 joins second top rail 174 at respective ends thereof. In a preferred fashion second rear upper member 190 receives second rear lower member 192 in female to male relationship.

Preferably second front upper member 180 is secured in relation to second front lower member 182 by a series of concentric apertures 160 in each member, which receive one or more of the desired nut and bolt assembly 162 or cotter pin assemblies 164, or equivalent fastening device. Likewise second rear upper member 180 is secured to second rear lower member 182 by a series of concentric apertures 160 in each member, which receive the desired nut and bolt assembly 162, or the like.

Also preferred as shown in FIG. 4 and FIG. 5 is a rear cross member 200. Rear cross member 200 connects the first joint 202 (where first rear upper member 150 joins first top rail 134) to second joint 204 (where second rear upper member 190 joins second top rail 174). Rear cross member 200 may have nestable members including first nestable member 210 and second nestable member 212 in a preferred male to female relationship, to provide for adjustability based on the width of vehicle 112.

Likewise rear cross-member 200 is secured in a fixed relation by friction or a series of concentric apertures 160 in each member, which receive one or more of the desired nut and bolt assembly 162 or cotter pin assemblies 164, or equivalent fastening device. The nestable members provide both for adjustability, or removal and storage, as one may desire. Alternatively, third dual male member 214 (FIG. 5) may provide the male part of the nestable relationship for first nestable member 210 and second nestable member 212. A structure similar to third male member 214 is adaptable for all other parts of frame 120, without depicting the same in a specific figure.

A support panel 220 is mounted on first end support 122 and second end support 124. More specifically, first top rail 134 and second top rail 174 receive support panel 220, after first end support 122 and second end support 124 have been adjusted to fit the appropriate vehicle 112.

While support panel 220 may be a solid sheet 222 (FIG. 2), it is preferably a first half sheet 224 and a second half sheet 226 (FIG. 3). Support panel 220 is preferably in two pieces for flexibility. It is possible to provide hinges 228 to join first half sheet 224 and second half sheet 226, for ease of handling.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A storage support assembly adapted to fit into a vehicle having a frame support and a panel, comprising:
   (a) the storage support assembly having a frame support and a panel;
   (b) the storage support assembly serving to provide accessibility for luggage in a rear portion of a vehicle;
   (c) the frame support being adapted to fit into the rear of a vehicle;
   (d) the frame support being adapted to receive the panel;
   (e) the storage support assembly serving to provide a lower storage space beneath the panel;
   (f) the storage support assembly serving to provide an upper storage space above the panel;
   (g) the frame support having a first end support and a second end support;
   (h) the panel fitting on the frame support in order to provide an upper storage space and a lower storage space in the vehicle;
   (i) the frame support fitting into a rear portion of the vehicle;
   (j) the panel extending from the first end support to the second end support;
   (k) the first end support having a first panel brace;
   (l) the first panel brace receiving a first end of the panel;
   (m) the first panel brace being a first elongated member and having a first pair of legs;
   (n) the first pair of legs including a first forward leg and a first rear leg;
   (o) the first forward leg and first rear being mounted at opposing ends of the first panel brace;
   (p) the second end support having a second panel brace;
   (q) the second panel brace receiving a second end of the panel;
   (r) the second panel brace being a second elongated member and having a second pair of legs;
   (s) the second pair of legs including a second forward leg and a second rear leg;
   (s) the second forward leg and the second rear leg being mounted at opposing ends of the second panel brace;
   (t) the first pair of legs and the second pair of legs being adaptable to fit the rear of the vehicle;
   (u) the panel having a first panel section and a second panel section;
   (v) the first panel brace being adjustable in length;
   (w) the first pair of legs having each member of the first pair be adjustable in length;
   (x) the second panel brace being adjustable in length; and
   (y) the second pair of legs having each member of the second pair of legs being adjustable in length.

2. The storage support assembly of claim 1 further comprising:
   (a) an adjusting means cooperating with the first end support and second end support; and
   (b) the adjusting means providing an adjustment mechanism for at least one member selected from the group consisting of the first panel brace, the first pair of legs, the second panel brace, and the second pair of legs.

3. The storage support assembly of claim 2 further comprising:
   (a) the adjusting means including a series of matched aperture pairs; and
   (b) a nut and bolt assembly being adapted to fit into at least one matched aperture pairs.

4. The storage support assembly of claim 1 further comprising:
   (a) the first panel section being secured to the second panel section; and
   (b) the first panel section being movable relative to the second panel.

5. A storage support assembly adapted to fit into a vehicle having a frame support and a panel, comprising:
   the storage support assembly having a frame support and a panel;
   the storage support assembly serving to provide accessibility for luggage in a rear portion of a vehicle;
   the frame support being adapted to fit into the rear of a vehicle;
   the frame support being adapted to receive the panel;
   the storage support assembly serving to provide a lower storage space beneath the panel;
   the storage support assembly serving to provide an upper storage space above the panel;
   the frame support having a first end support and a second end support;
   the panel fitting on the frame support in order to provide an upper storage space and a lower storage space in the vehicle;
   the frame support fitting into a rear portion of the vehicle;
   a rear cross member connecting the first end support and the second end support the frame support;
   the panel fitting on the frame support in order to provide an upper storage space and a lower storage space in the vehicle;
   the frame support fitting into a rear portion of the vehicle;
   the panel extending from the first end support to the second end support;
   the first end support having a first panel brace;
   the first panel brace receiving a first end of the panel;
   the first panel brace being a first elongated member and having a first pair legs, each member of the first pair of legs being at opposing ends of the first panel brace;
   the second end support having a second panel brace;
   the second panel brace receiving a second end of the panel;
   the first pair of legs and the second pair of legs being adaptable to fit the rear of the vehicle;
   the panel having a first panel section and a second panel section;
   the second panel brace being a second elongated member and having a second pair of legs, each member of the second pair of legs being at opposing ends of the second panel brace;
   the first panel section being secured to the second panel section;
   the first panel section being movable relative to the second panel;
   the first panel brace being adjustable in length;
   the first pair of legs having each member of the first pair be adjustable in length;
   the second panel brace being adjustable in length;
   the second pair of legs having each member of the second pair of legs be adjustable in length;
   an adjusting means cooperating with the first end support and second end support;

the adjusting means providing an adjustment mechanism for at least one member selected from the group consisting of the first panel brace, the first pair of legs, the second panel brace, and the second pair of legs.

6. The storage support assembly of claim 5 further comprising:

(a) the adjusting means including a series of matched aperture pairs; and (b) a nut and bolt assembly being adapted to fit into at least one matched aperture pairs.

7. An adjustable storage support assembly adapted to fit into a vehicle having a frame support and a panel, comprising:

the storage support assembly having a frame support and a panel;

the storage support assembly serving to provide accessibility for luggage in a rear portion of a vehicle;

the frame support being adapted to fit into the rear of a vehicle;

the frame support being adapted to receive the panel;

the storage support assembly serving to provide a lower storage space beneath the panel;

the storage support assembly serving to provide an upper storage space above the panel;

the frame support having a first end support and a second end support;

the panel fitting on the frame support in order to provide an upper storage space and a lower storage space in the vehicle;

the frame support fitting into a rear portion of the vehicle;

a rear cross member connecting the first end support and the second end in order to strengthen the frame support;

the panel fitting on the frame support in order to provide an upper storage space and a lower storage space in the vehicle;

the frame support fitting into a rear portion of the vehicle;

the panel extending from the first end support to the second end support;

the first end support having a first panel brace;

the first panel brace receiving a first end of the panel;

the first panel brace being a first elongated member and having a first pair legs, each member of the first pair of legs being at opposing ends of the first panel brace;

the second end support having a second panel brace;

the second panel brace receiving a second end of the panel;

the first pair of legs and the second pair of legs being adaptable to fit the rear of the vehicle;

the panel having a first panel section and a second panel section;

the second panel brace including a second elongated member and having a second pair of legs, each member of the second pair of legs being at opposing ends of the second panel brace;

the first panel brace being adjustable in length;

the first pair of legs having each member of the first pair be adjustable in length;

the second panel brace being adjustable in length;

the second pair of legs having each member of the second be adjustable in length;

an adjusting means cooperating with the first end support and second end support;

the adjusting means providing an adjustment mechanism for at least one member selected from the group consisting of the first panel brace, the first pair of legs, the second panel brace, and the second pair of legs;

the adjusting means including a series of matched aperture pairs; and a nut and bolt assembly being adapted to fit into at least one matched aperture pairs.

8. A frame support for an adjustable storage support assembly adapted to fit into a vehicle and adapted to receive a panel, the frame support comprising:

the frame support being adapted to fit into the rear of a vehicle;

the frame support having a first end support and a second end support;

the first end support having a first panel brace;

the first panel brace be adapted to receive a first end of the panel;

the first panel brace being a first elongated member and having a first pair legs, each member of the first pair of legs being at opposing ends of the first panel brace;

the second end support having a second panel brace;

the second panel brace being adapted to receive a second end of the panel;

the first pair of legs and the second pair of legs being adaptable to fit the rear of the vehicle;

the second panel brace including a second elongated member and having a second pair of legs, each member of the second pair of legs being at opposing ends of the second panel brace;

the first panel brace being adjustable in length;

the first pair of legs having each member of the first pair be adjustable in length;

the second panel brace being adjustable in length;

the second pair of legs having each member of the second be adjustable in length;

an adjusting means cooperating with the first end support and second end support;

the adjusting means providing an adjustment mechanism for at least one member selected from the group consisting of the first panel brace, the first pair of legs, the second panel brace, and the second pair of legs;

a rear cross member connecting the first end support and the second end support the frame support; and the adjusting means permitting the storage support to be used in a number of different vehicles.

* * * * *